(12) United States Patent
Wang

(10) Patent No.: US 6,894,892 B2
(45) Date of Patent: May 17, 2005

(54) INTERFACE CONTROLLER MOUNTED IN A SCSI HOLE

(75) Inventor: Hong-Chuan Wang, Taipei (TW)

(73) Assignee: EPO Science & Technology Inc., Taipei (TW)

( * ) Notice: Subject to any disclaimer, the term of this patent is extended or adjusted under 35 U.S.C. 154(b) by 134 days.

(21) Appl. No.: 10/379,659

(22) Filed: Mar. 6, 2003

(65) Prior Publication Data

US 2004/0193773 A1 Sep. 30, 2004

(51) Int. Cl.[7] .................................................. H05K 5/00
(52) U.S. Cl. ..................... 361/679; 361/736; 361/748; 361/752
(58) Field of Search ............................... 361/679, 736, 361/748, 752, 760, 783, 785

(56) References Cited

U.S. PATENT DOCUMENTS 6,126,451 A * 10/2000 Zandy et al. .................. 439/61
6,658,516 B2 * 12/2003 Yao .............................. 710/301
6,721,176 B2 * 4/2004 Kwong et al. ............... 361/685

* cited by examiner

*Primary Examiner*—Yean-Hsi Chang
(74) *Attorney, Agent, or Firm*—Troxell Law Office, PLLC

(57) ABSTRACT

An interface controller mounted in a SCSI hole includes a circuit board and a panel. The circuit board is associated with a chip, an IDE interface male plug and control circuit. The panel is disposed at a lateral side of the circuit board and has a size adapted to the SCSI hole and being joined to an inner side of the SCSI hole. The panel is associated with an inserted recess so as to be fixed to a used casing of an independent CD-ROM drive or hard disk drive with SCSI socket for saving production cost.

3 Claims, 3 Drawing Sheets

INTERFACE CONTROLLER MOUNTED IN A SCSI HOLE

BACKGROUND OF THE INVENTION

1. Field of the Invention

The present invention relates to a transmission interface controller adapted to an independent CD-ROM drive or a hard disk drive and particularly to a USB interface controller or an IEEE1394 interface controller.

2. Description of Related Art

Referring to FIG. 1, a casing 10 for an independent CD-ROM drive or hard disk drive is provided with locating holes 11, 12 for small computer system interface (SCSI) sockets and the SCSI interface controller is joined to control circuit in the casing 10.

Due to the technology of transmission interface being getting upgrade, using universal serial bus (USB) interface and institute of electrical and electronic engineers (IEEE) interface are better in quality and higher in speed for data transmission than using original SCSI interface. Currently, the USB interface and the IEEE1394 interface mostly are adopted instead of the SCSI interface.

Usually, in order to save the cost, a manufacturer of casings for independent CD-ROM drive or hard disk drive has not developed a new casing for being mounted with a USB interface controller or an IEEE1394 interface controller yet and still fabricates a great deal of original casings 10 with locating holes 11, 12, which are capable of being mounted with SCSI sockets as shown in FIG. 1 only, for makers of the independent CD-ROM drive or hard disk drive. However, makers of the independent CD-ROM drive or hard disk drive have to fabricate a new casing for accommodating the independent CD-ROM drive or hard disk drive such that the production cost is increased and the product competition is lowered.

SUMMARY OF THE INVENTION

The crux of the present invention is in that the USB interface controller or the IEEE1394 interface controller can be mounted in a cheaper used casing to lower down the production cost of independent CD-ROM drive or hard disk drive and to replace the old SCSI interface controller in the independent CD-ROM drive or hard disk drive with a USB interface controller or an IEEE1394 interface controller conveniently.

Accordingly, a primary object of the present invention is to provide an interface controller mounted in a SCSI hole such that a used casing for an independent CD driver or hard disk device can be fixed with a new interface controller and the cost can be saved effectively.

BRIEF DESCRIPTION OF THE DRAWINGS

The present invention can be more fully understood by reference to the following description and accompanying drawing, in which.

DETAILED DESCRIPTION OF THE PREFERRED EMBODIMENTS

Figure 1:
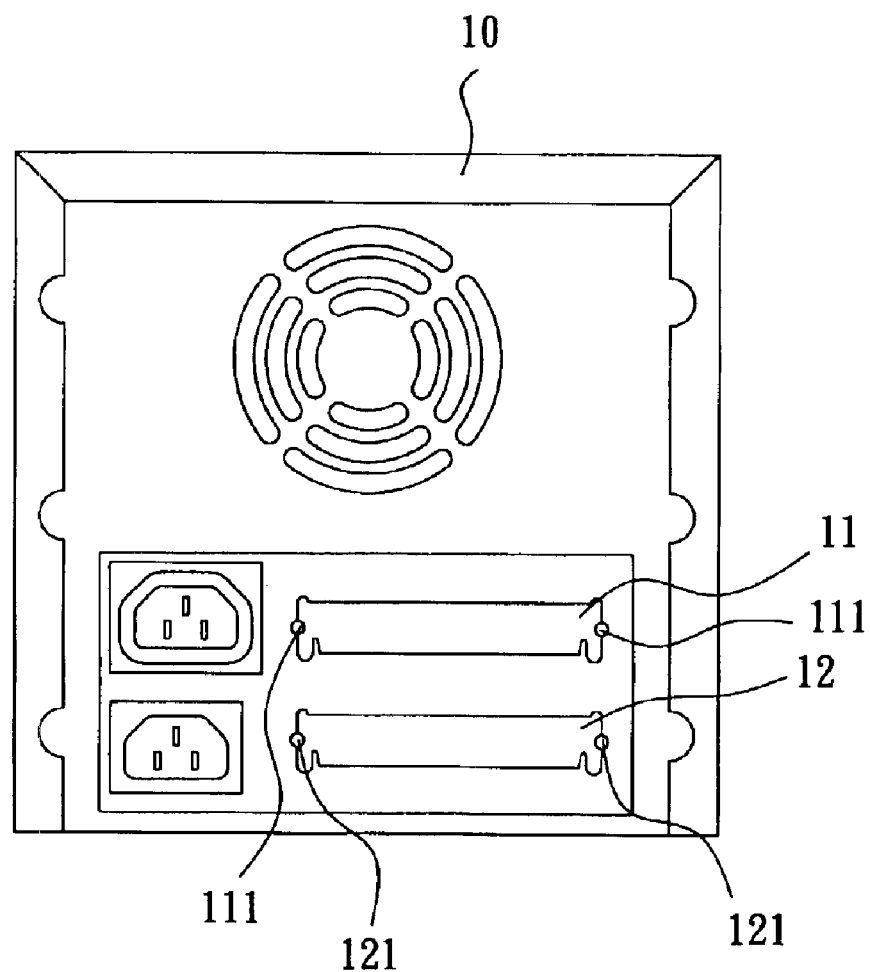
FIG. 1 is a rear view of a main unit casing of the conventionally used personal computer.
Figure 2:
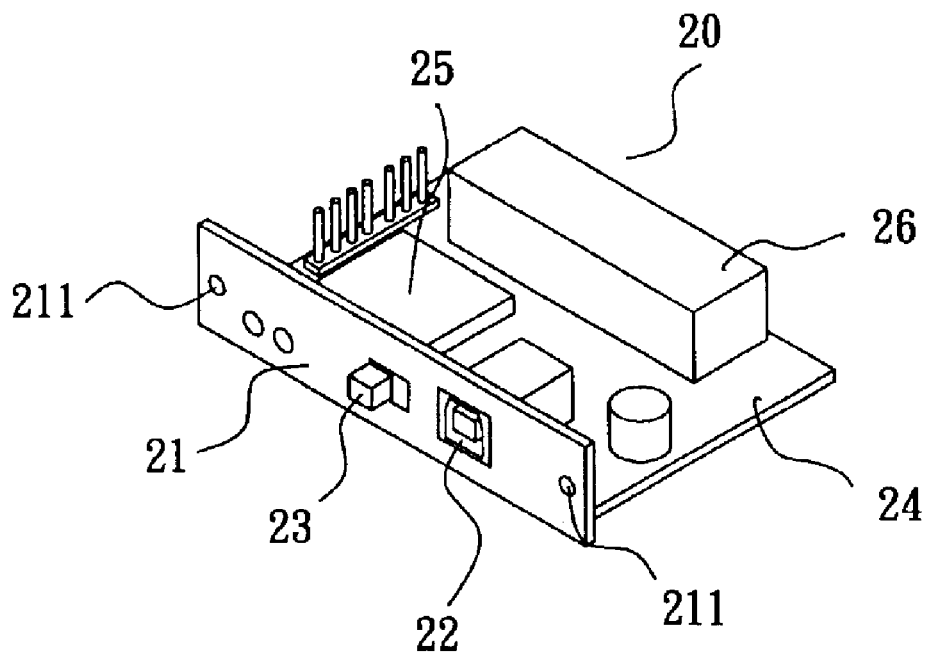
FIG. 2 is a perspective view of a USB interface controller according to the present invention.

Referring to FIG. 2, a USB interface controller 20 of the present invention is different from the conventional USB interface controller in that the USB interface controller 20 at a panel 21 thereof has a size corresponding to locating holes 11, 12 of the conventionally used casing 10 shown in FIG. 1. The panel 21 at both lateral sides thereof provides threaded holes 211 corresponding to threaded holes 111, 121 disposed at two lateral sides of the locating holes 11, 12 respectively such that the panel 21 can be mounted at the inner side of the locating holes 11, 12 and the USB interface at a socket 22 and a switch 23 thereof extends outward the locating holes 11, 12. Of course, the USB interface controller 20 is equipped with circuit board 24 generally required by a USB interface controller. The circuit 24 is associated with a chip 25, an IDE interface male plug 26 and control circuit and the panel 21 is associated with the circuit board 24 at a lateral side of the circuit board 24.

Figure 3:
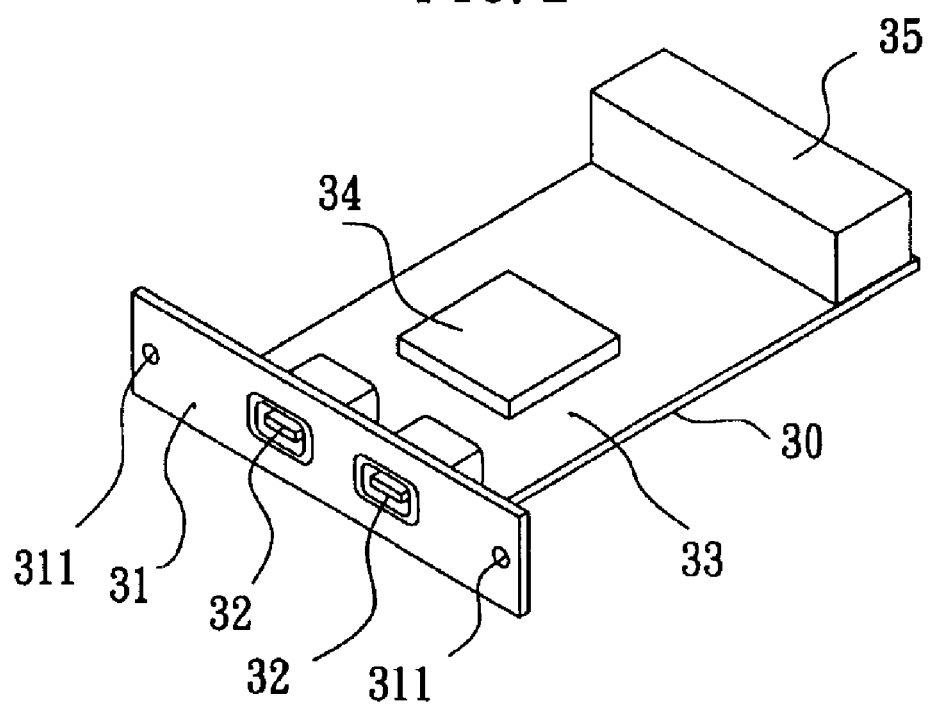
FIG. 3 is a perspective view of an IEEE1394 interface controller according to the present invention.

Referring to FIG. 3, the IEEE1394 interface controller 30 of the present invention is different from the conventional IEEE1394 in that the IEEE1394 interface controller 30 at the panel 31 thereof has a size for being accommodated in the locating holes 11, 12 of the conventionally used casing 10 shown in FIG. 1. The panel 31 at both lateral sides thereof provides threaded holes 311 corresponding to threaded holes 111, 121 disposed at two lateral sides of the locating holes 11, 12 respectively such that the panel 31 can be mounted at the inner side of the locating holes 11, 12 and the IEEE1394 interface at a socket 32 thereof extends outward the locating holes 11, 12. Of course, the IEEE1394 interface controller 30 is equipped with circuit board 33 generally required by an IEEE1394 interface controller. The circuit board 33 is associated with a chip 34, an IDE interface male plug 35 and control circuit and the panel 31 is associated with the circuit board 33 at a lateral side of the circuit board 33.

Figure 4:
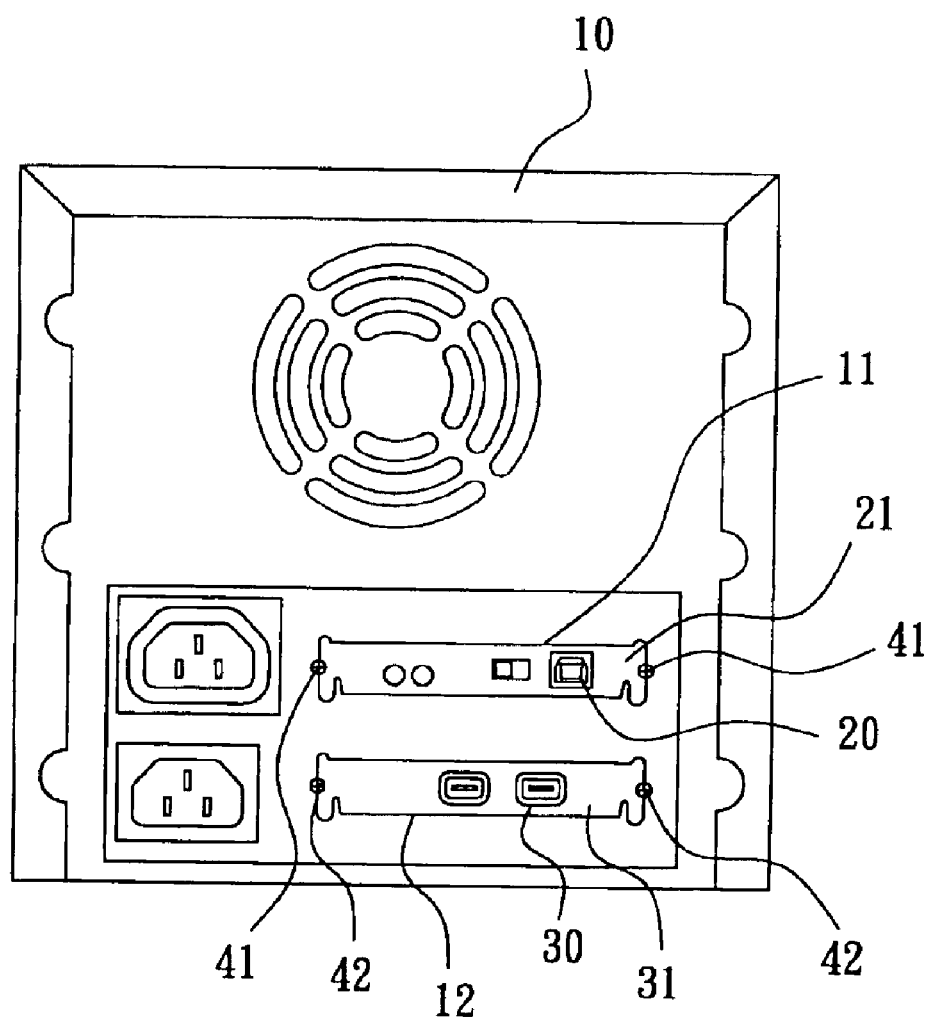
FIG. 4 is another rear view of a main unit of the conventionally used personal computer illustrating the USB interface controller and the IEEE1394 interface controller of the present invention having been mounted.

Referring to FIG. 4, the USB interface controller 20 and the IEEE1394 interface controller 30 are fixed to inner sides of the SCSI holes 11, 12 at the rear side of the main unit casing 10 respectively by means of screws 41, 42 passing through threaded holes at both lateral sides of the casing 10 and threaded holes at both lateral sides of the panel 21 of the USB interface controller 20 and of the panel 31 of the IEEE1394 respectively instead of making a new casing for being mounted with an ordinary USB interface controller or IEEE1394 interface controller.

The interface controller of the present invention allows an independent CD-ROM drive or hard disk drive to join with a new USB interface controller or IEEE1394 interface controller with original casing, which is a used casing provided with holes for SCSI sockets, instead of making a new casing specially for the interface controller so that the it is economical for the production cost. Further, an independent CD-ROM drive or hard disk drive with SCSI interface controller can be replaced with a new USB interface controller or an IEEE1394 interface controller by means of the present invention.

It is appreciated that the USB interface and the IEEE1394 interface controller disclosed in the application are innovative and locating holes for the SCSI sockets in a used casing of an independent CD-ROM drive or hard disk drive can accommodate both the USB and the IEEE1394 interface controllers.

While the invention has been described with reference to a preferred embodiment thereof, it is to be understood that modifications or variations may be easily made without departing from the spirit of this invention, which is defined by the appended claims.

What is claimed is:

1. An interface controller mounted in a SCSI hole, comprising:

a circuit board, being associated with a chip, an IDE interface male plug and control circuit; and a panel, being disposed at a lateral side of the circuit board and having a size adapted to the SCSI hole and being joined to an inner side of the SCSI hole, wherein the panel at two lateral sides thereof has threaded holes corresponding to threaded holes at two lateral sides of the SCSI hole.

2. An interface controller mounted in a SCSI hole, comprising:

a circuit board, being associated with a chip, an IDE interface male plug and control circuit; and a panel, being disposed at a lateral side of the circuit board and having a size adapted to the SCSI hole and being joined to an inner side of the SCSI hole, wherein the interface controller is a USB interface controller and the panel further joins with a switch extending outward from the SCSI hole, wherein the panel at two lateral sides thereof has threaded holes corresponding to threaded holes at two lateral sides of the SCSI hole.

3. An interface controller mounted in a SCSI hole, comprising:

a circuit board, being associated with a chip, an IDE interface male plug and control circuit; and a panel, being disposed at a lateral side of the circuit board and having a size adapted to the SCSI hole and being joined to an inner side of the SCSI hole, wherein the interface controller is an IEEE1394 interface controller, wherein the panel at two lateral sides thereof has threaded holes corresponding to threaded holes at two lateral sides of the SCSI hole.

* * * * *